W. E. PEARSON.
APPARATUS FOR FILLING RECEPTACLES WITH LIQUID.
APPLICATION FILED MAY 25, 1912.
1,084,658.
Patented Jan. 20, 1914.
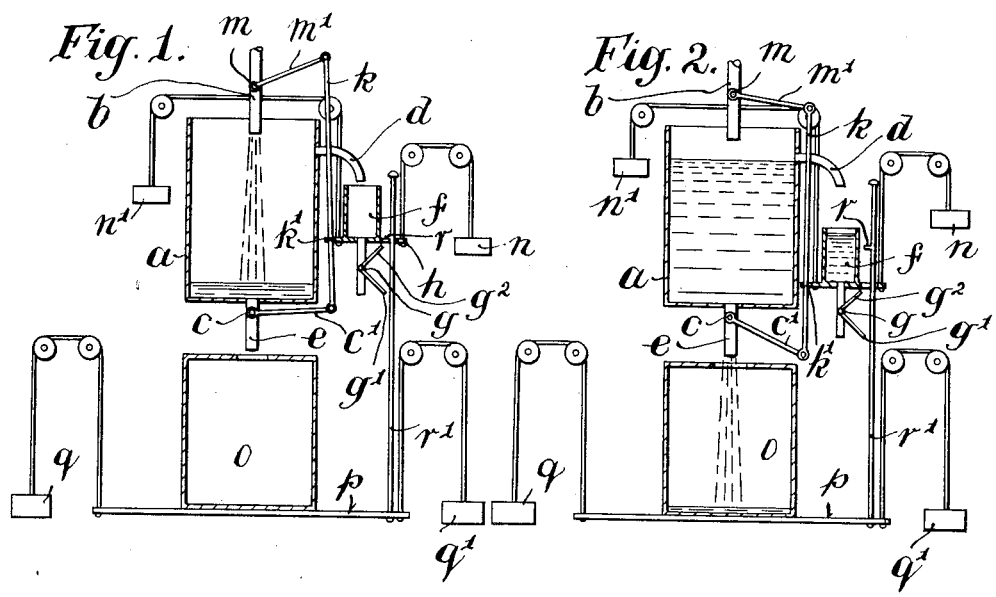
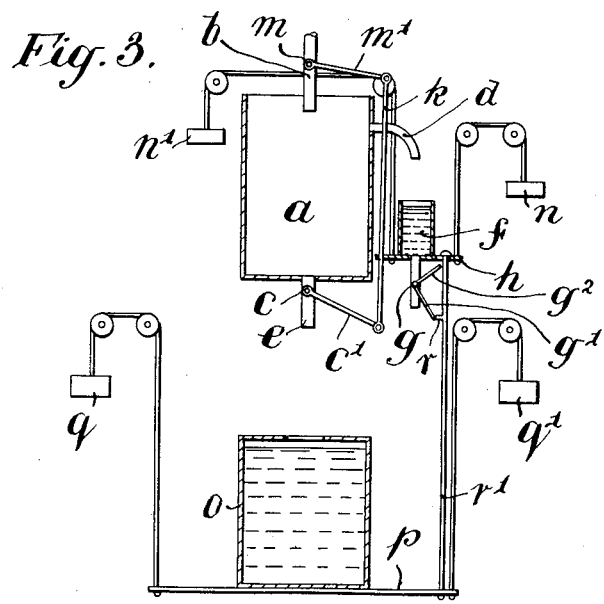
WITNESSES:
John C. Sanders
Albert F. Henman
INVENTOR:
William Edward Pearson
By Wallace White
ATT'Y

UNITED STATES PATENT OFFICE.

WILLIAM EDWARD PEARSON, OF LONDON, ENGLAND, AND HAMBURG, GERMANY.

APPARATUS FOR FILLING RECEPTACLES WITH LIQUID.

1,084,658. Specification of Letters Patent. Patented Jan. 20, 1914.

Application filed May 25, 1912. Serial No. 699,622.

*To all whom it may concern:*

Be it known that I, WILLIAM EDWARD PEARSON, of 15 Elm street, Gray's Inn Road, London, England, and Industrie Haus, Deichstrasse, Hamburg, Germany, manufacturer, have invented certain new and useful Improvements in and Relating to Apparatus for Filling Receptacles with Liquid, of which the following is a specification.

This invention relates to an apparatus for filling receptacles with liquid, and has for its object to provide an improved automatic filling apparatus. The apparatus made in accordance with this invention comprises a vessel adapted to be filled or partially filled with a liquid for the purpose of operating cocks which regulate the flow of the liquid.

The operating vessels are mounted on platforms which are suspended by cords passing over rollers or other means and connected to counterweights, which vary according to requirements and according to the size of receptacle to be filled. At the same time the movable platforms are connected with cocks by means of levers which are operated according to the movement or position of the platform or platforms.

Figures 1, 2 and 3 are diagrammatic views of apparatus made in accordance with the invention.

The apparatus comprises a measuring chamber $a$, a liquid supply pipe $b$, the chamber having an overflow pipe $d$, a discharge pipe $e$, said discharge pipe being controlled by a cock $c$ and an operating vessel $f$ to catch the liquid which overflows from the measuring chamber, said operating vessel being provided with a cock $g$. The said operating vessel is mounted on a movable platform $h$ and is connected by a link $k$ to lever $m'$ of the cock $m$ and to lever $c'$ of cock $c$. The link $k$ is also pivoted at $k'$ to the platform $h$ so that when the platform rises or falls the link $k$ is operated by the platform. The platform $h$ is suspended from balance weights $n$ and $n'$. The vessel $f$ is fitted on its lower side with a cock $g$, the cock being provided with a bell crank lever having arms $g'$ $g^2$ operated by a tappet $r$ on the rod $r'$. The rod $r'$ is connected at its lower end to a platform $p$, which platform carries the receptacle $o$ and which platform is suspended from balance weights $q$ $q'$.

In use, when it is desired to fill a receptacle, the receptacle is placed below the measuring chamber on a movable platform $p$. The liquid is allowed to fill the chamber $a$ in each case and, as soon as the chamber $a$ is filled to the overflow orifice $d$ the desired quantity is reached, and the liquid in the measuring chamber $a$ overflows into the operating vessel $f$ until the same and the liquid therein becomes heavier than the counterweights $n$ and $n'$. The platform $h$ which is connected at $k'$ to the link $k$, with the vessel descends, turning off the supply cock $m$ and opening the discharge cock $c$ by means of the lever $c'$. The contents flow into the receptacle $o$ which is on a movable platform $p$ connected with independent counterweights $q$, $q'$. As soon as the receptacle $o$ is filled and the weight of the vessel and liquid contained therein is in excess of the counterweights $q$, $q'$ the platform $p$ descends opening the cock $g$ of the operating vessel. The operating vessel is emptied and the platform $h$ rises, which in rising opens the supply cock $m$ and closes the delivery cock $c$. The operation thereof is repeated and can be stopped by turning off an independent cock (not shown) governing the supply. In this manner a large number of receptacles can be filled with a predetermined quantity without a waste of time or material or danger of overflowing. The supply can be regulated by means of the cock (not shown) and the whole operation can be stopped by completely turning off this supply.

What I claim as my invention, and desire to secure by Letters Patent is:—

In apparatus for measuring and delivering liquid, the combination of a measuring chamber, an inlet and outlet to said chamber, cocks on the inlet and outlet, an overflow pipe from the measuring chamber, counterweights, a movable platform suspended and counterbalanced by said weights, an operating vessel on said platform adapted to be filled by liquid discharged from the overflow pipe, a link connecting said movable platform with the inlet and outlet cocks so that the inlet cock closes and the outlet cock opens when the platform is caused to descend by the weight of the liquid in the vessel; a discharge cock for said operating vessel, a second movable and counterbalanced platform disposed below the measuring chamber, means for moving said second platform by the weight of liquid which has passed through the outlet cock, means for opening and closing the cock on the discharge pipe of the operating vessel actuated by the movement of the second movable platform.

In testimony whereof I have signed my name to this specification in the presence of two subscribing witnesses.

WILLIAM EDWARD PEARSON.

Witnesses:
WILLIAM MOEDIG,
THOMAS DAVISON.

Copies of this patent may be obtained for five cents each, by addressing the "Commissioner of Patents, Washington, D. C."